United States Patent Office 2,744,116
Patented May 1, 1956

2,744,116

BIS-(AMINOTRIAZOLYL-)-HYDROCARBONS

Randolph Norris Shreve, West Lafayette, Ind., and Robert Koridon Charlesworth, Walnut Creek, Calif., assignors to Purdue Research Foundation, Lafayette, Ind., a corporation of Indiana No Drawing. Application December 4, 1953,
Serial No. 396,344

10 Claims. (Cl. 260—308)

This invention relates to a new process and novel organic chemical compounds produced thereby, and is more particularly concerned with the condensation of a dibasic acid with aminoguanidine and subsequent cyclization of the condensation product to prepare bis-aminotriazolyl-hydrocarbons.

Specifically, the reaction of the present invention may be depicted by the following sequence of reaction steps:

$$HOOC-C_nH_m-COOH + 2H_2N-C-NH-NH_2$$
$$\underset{NH}{\|}$$

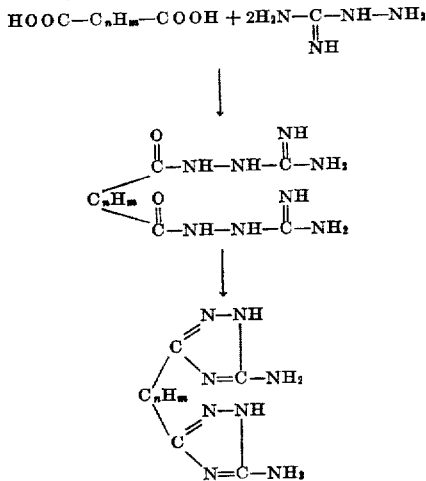

wherein $n$ is an integer from zero to twelve, inclusive, and $m$ is two $n$ or two $n$ minus two.

The first step of the process of this invention utilizes a dibasic acid having the formula:

$$HOOC-C_nH_m-COOH$$

wherein $n$ and $m$ have the values above-assigned. Representative dibasic acids which are suitable include, for example, glutaric, adipic, oxalic, malonic, succinic, pimelic, subgenic, azeloic, sebasic, methyl-succinic, dimethylsuccinic, maleic, fumaric, citraconic, mesaconic, itaconic, dimethylmaleic, methylethylmaleic, glutaconic, et cetera, acids. This dibasic acid is condensed with aminoguanidine, by dissolving both materials in water and evaporating the mixture to dryness. Generally speaking, solutions of both materials will only occur upon heating the materials to about the boiling point of the mixture. The amount of water employed is that quantity necessary to achieve solution of both materials and excesses may be used, if desired. However, since all water must be removed to obtain the intermediate of the present invention, large excesses of water are not economically feasible. Aminoguanidine is normally employed in a ratio of two moles to each mole of dibasic acid used. The aminoguanidine may be employed as a free material or combined with an acid, for example, as the hydrochloride, hydrobromide, hydroiodide, nitrate, bicarbonate, sulfate, et cetera, however, it is preferred that it be used as the hydrochloride, because of its increased solubility. It is important that the aminoguanidine and dibasic acid are in solution before the evaporation is started, else the evaporation step will proceed difficultly at the final stages. The diguanidylacidamides formed in this step of the invention are high melting crystalline solids soluble in water.

The second step of the procedure of the present invention includes the cyclization of the diguanidylacidamide of the first step by dissolving in water, containing a soluble carbonate salt, such as, for example, potassium carbonate, sodium carbonate, et cetera, evaporating the resulting product either to dryness or to a small volume and crystallizing, and washing the residue to remove all traces of alkaline material. The carbonate salt is used in an amount sufficient to neutralize all acid which may be present either combined, or uncombined in the solution, and a slight excess of alkaline material is preferred. Upon admixture of a suitable amount of alkaline material, water and diguanidylacidamide, the mixture is treated so as to completely evaporate the water. Again, the amount of water employed is not critical, but is preferably a minimum amount in order that removal thereof is readily facilitated. After removal of the water, the resulting bis-triazolyl hydrocarbon material is washed with a suitable washing agent, preferably cold water, to remove all traces of alkaline substances. A convenient test is to use hydrion paper, and wash the reaction product with water until the resulting wash water is neutral to such paper.

The compounds of the present invention are soluble in hot water, partially soluble in cold water and are high melting solids. They readily form acid addition salts with acids, such as, for example, hydrochloric, nitric, picric, hydrobromic, lactic, acetic, sulfuric, et cetera, but will also exhibit alkaline properties by forming salts with silver. They are fairly stable to oxidizing and hydrolyzing agents, but will form azo derivatives with appropriate coupling materials, such as, for example, 2-naphthol, in the presence of appropriate diazotizing materials, such as, for example, sodium nitrite and aqueous sulfuric acid. These azo derivatives have exceptional dyeing properties.

The following examples are given to illustrate specific procedures of the present invention but they are not to be construed as limiting.

*Example 1.—1,4-bis-[3-(5-amino-1,2,4-triazolyl)]-butane*

Thirteen and one-half (13.5) grams (0.092 mole) of adipic acid was dissolved in water with 20.3 grams (0.184 mole) of aminoguanidine hydrochloride by heating the admixture slowly to boiling. After an hour of slow boiling, the solution was evaporated to dryness by means of a steam bath. The evaporation residue was recrystallized twice from an ethanol-water mixture, washed with dilute ethanol, and dried at 110 degrees centigrade to give N,N'-diguanidyladipamide dihydrochloride, melting at 216–218 degrees centigrade.

Analysis:
Calculated for $C_8H_{20}N_8O_2$---- C, 29.01  H, 6.90  N, 33.83
                                  28.87     6.52     32.17
Found ---------------------------- 29.00    6.70     32.31

A mixture of 25 grams (0.075 mole) of diguanidyladipamide dihydrochloride and 15.5 grams (0.113 mole) of anhydrous potassium carbonate in water was heated on a steam bath, causing a slight evolution of carbon dioxide, and the solids to go into solution. After continued heating, a solid separated from solution and the evaporation was continued until a completely dry, grayish-white solid residue remained. The residual matter was suspended in cold water and the resulting suspension stirred until all solid lumps were dispersed. The mixture was filtered by suction in a Buchner funnel and washed twice with cold water. After several additional cold water extractions, the mixture was neutral to hydrion paper. Two recrystallizations from hot water solution, followed by drying at 55 degrees centigrade yielded a pure product (rod-shaped crystals) melting at 278–280 degrees centigrade, 1,4-bis-[3-(5-amino-1,2,4-triazolyl)]-butane, soluble in both dilute hydrochloric acid and dilute sodium hydroxide, but only slightly soluble in hot formamide and insoluble in the common organic solvents.

Analysis:

| | C | H | N |
|---|---|---|---|
| Calculated for $C_8H_{14}N_8$ | 43.23 | 6.35 | 50.42 |
| Found | 43.69 | 6.36 | 50.39 |
| | 43.67 | 6.49 | 50.38 |

Following the procedure of Example 1, aminoguanidine nitrate was reacted with adipic acid and N,N'-diguanidyladipamide dinitrate, melting at 196–201 degrees centigrade with slow decomposition was obtained.

Analysis:

| | N |
|---|---|
| Calculated for $C_8H_{20}N_{10}O_8$ | 36.45 |
| Found | 35.96 |

Subsequent reaction of N,N'-diguanidyladipamide dinitrate (0.068 mole) with anhydrous potassium carbonate (0.129 mole) according to the procedure of Example 1, yielded 14.0 grams of crude 1,4-bis-[3-(5-amino-1,2,4-triazolyl)]-butane, melting at 263–265 degrees centigrade. Repeated recrystallization from water, followed by drying at 55 degrees centigrade, raised the melting point to 276–278 degrees centigrade.

*Example 2.—Bis-[3-(5-amino-1,2,4-triazolyl)]*

Twenty-five grams (25.0) (0.198 mole) of oxalic acid (dihydrate) and 43.8 grams (0.396 mole) of aminoguanidine hydrochloride were mixed with water and the resulting admixture heated slowly until all the solids dissolved. Upon continued heating for about five minutes, a white solid began to precipitate. The mixture was placed in a porcelain dish and evaporated to complete dryness by means of a steam bath. The white crystalline residue was treated with 48.3 grams (0.35 mole) of anhydrous potassium corbonate in aqueous solution and the resulting mixture evaporated by means of a steam bath, a light yellow solid separating from the solution immediately prior to dryness. The evaporation residue was suspended in cold water, dispersed evenly by stirring and the resulting undissolved solids filtered, washed with cold water and re-dispersed in cold water. The liquor was neutral to hydrion paper. Filtration yielded a solid which was then separated, washed and dried at 55 degrees centigrade. A portion was heated in water to boiling, the undissolved solid filtered and the solution cooled. A white solid separated and was dried at 55 degrees centigrade. The thus-recrystallized product failed to melt or decompose below about 350 degrees centigrade, and an ignition test indicating decomposition without melting yielded a dark carbon residue. Seventeen grams (55.7 percent of the theoretical yield) of the bis-[3-(5-amino-1,2,4-triazolyl)] was obtained.

Analysis:

| | C | H | N |
|---|---|---|---|
| Calculated for $C_4H_6N_8$ | 28.91 | 3.64 | 67.45 |
| Found | 29.02 | 3.60 | 67.29 |
| | 28.90 | 3.89 | 67.42 |

*Example 3.—Other bis-(5-amino-triazolyl)alkanes*

Following the procedure of Example 1 and using the appropriate aliphatic dibasic acid together with the aminoguanidine hydrochloride reactant, followed by cyclization with anhydrous potassium carbonate, the following compounds were obtained:

1. Bis-[3-(5-amino-1,2,4-triazolyl)]-methane, at 33.5 percent yield of product melting at 293 degrees centigrade (with yellow discoloration above 289 degrees centigrade). The compound is soluble in water, dilute hydrochloric acid and dilute sodium hydroxide, but is insoluble in common organic solvents.

Analysis:

| | C | H | N |
|---|---|---|---|
| Calculated for $C_5H_8N_8$ | 33.33 | 4.47 | 62.20 |
| Found | 33.27 | 4.41 | 62.71 |
| | 33.33 | 4.30 | 62.56 |

2. 1,2-bis-[3-(5-amino-1,2,4-triazolyl)]-ethane. A forty percent (40.0) yield of the theoretical was obtained, the product melting at 310–312 degrees centigrade. The product is soluble in hydrochloric acid, five percent sodium hydroxide, slightly soluble in water and insoluble in common organic solvents.

Analysis:

| | C | H | N |
|---|---|---|---|
| Calculated for $C_6H_{10}N_8$ | 37.11 | 5.19 | 57.70 |
| Found | 37.06 | 5.19 | 57.51 |
| | 37.10 | 5.22 | 57.69 |

3. 1,3-bis-[3-(5-amino-1,2,4-triazolyl)]-propane. A twenty percent yield of the theoretical of the product, melting at 243–244 degrees centigrade was obtained. The compound is soluble in five percent hydrochloric acid and five percent sodium hydroxide, slightly soluble in water and insoluble in common organic solvents.

Analysis:

| | C | H | N |
|---|---|---|---|
| Calculated for $C_7H_{12}N_8$ | 40.37 | 5.81 | 53.82 |
| Found | 40.35 | 5.74 | 54.60 |
| | 40.52 | 5.83 | 54.70 |

4. 1,7-bis-[3-(5-amino-1,2,4-triazolyl)]-heptane. A 50.3 percent of the theoretical yield of product, melting at 217–219 degrees centigrade, was obtained. The compound is soluble in five percent hydrochloric acid, and five percent sodium hydroxide, and was slightly soluble in water.

Analysis:

| | C | H | N |
|---|---|---|---|
| Calculated for $C_{11}H_{20}N_8$ | 49.98 | 7.63 | 42.39 |
| Found | 50.05 | 7.70 | 42.28 |
| | 50.05 | 7.71 | 42.15 |

5. 1,5-bis-[3-(5-amino-1,2,4-triazolyl)]-pentane. A 43 percent of the theoretical yield of product, melting at 224–227 degrees centigrade, was obtained. The compound is soluble in hot water, five percent hydrochloric acid, five percent sodium hydroxide, but insoluble in ethanol and cold water.

6. 1,6-bis-[3-(5-amino-1,2,4-triazolyl)]-hexane. A 57 percent of the theoretical yield of the product, melting at 270–273 degrees centigrade was obtained. The compound is soluble in hot water, five percent hydrochloric acid, five percent sodium hydroxide, but insoluble in ethanol and cold water.

7. 1,8-bis-[3-(5-amino-1,2,4-triazolyl)]-octane. A 49 percent of the theoretical yield of the product, melting at 238–241 degrees centigrade was obtained. The compound is soluble in hot water, five percent hydrochloric acid, five percent sodium hydroxide, partially soluble in cold water, but insoluble in ethanol.

8. 1,2-bis-[3-(5-amino-1,2,4-triazolyl)]-ethene. A 25 per cent yield of the theoretical of product, melting in excess of 350 degrees centigrade was obtained. The compound is soluble in five percent hydrochloric acid and alcohol, but is insoluble in water and five percent sodium hydroxide.

Analysis:

| | C | H | N |
|---|---|---|---|
| Calculated for $C_6H_8N_8$ | 37.50 | 4.18 | 58.20 |
| Found | 33.03 | 4.48 | 48.08 |
| | 33.12 | 4.62 | 48.02 |

Various modifications may be made in the method and compounds of the present invention without departing from the spirit or scope thereof, and it is to be understood that we limit ourselves only as defined in the appended claims.

We claim:

1. A member of the group consisting of compounds having the formula:

$$\begin{array}{c} H-N-N \\ | \\ H_2N-C=N \end{array} C-C_nH_m-C \begin{array}{c} N-N-H \\ | \\ N=C-NH_2 \end{array}$$

wherein $m$ and $n$ are zero and compounds wherein $C_nH_m$ represent alkylene and aliphatic mono-olefinic hydrocarbon groups containing up to twelve carbon atoms.

2. A compound having the formula:

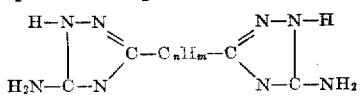

where in $n$ is an integer from one to twelve and $m$ is equal to $2n$.

3. A compound having the formula:

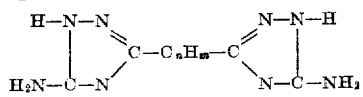

wherein $n$ is an integer from one to twelve and $m$ is equal to $2n-2$.

4. 1,4-bis-[3-(5-amino-1,2,4-triazolyl)]-butane.
5. Bis-[3-(5-amino-1,2,4-triazolyl)].
6. 1,2-bis-[3-(5-amino-1,2,4-triazolyl)]-ethane.
7. 1,8-bis-[3-(5-amino-1,2,4-triazolyl)]-octane.
8. 1,2-bis-[3-(5-amino-1,2,4-triazolyl)]-ethene.
9. The process which includes: contacting in the presence of water a dibasic acid having the formula:

wherein $m$ and $n$ are zero and compounds wherein $C_nH_m$ represent alkylene and aliphatic mono-olefinic hydrocarbons, groups containing up to twelve carbon atoms with aminoguanidine, removing the water, dissolving the resulting diguanidylacidamide in water, contacting with a soluble carbonate salt, removing water from the resulting mixture, and recovering the bis-(aminotriazolyl)-hydrocarbon thus-formed.

10. The process of claim 9, wherein the soluble carbonate salt is potassium carbonate.

References Cited in the file of this patent

UNITED STATES PATENTS 2,233,805    Broderson et al. _____ Mar. 4, 1941

FOREIGN PATENTS 473,810    Canada _____ May 22, 1951

UNITED STATES PATENT OFFICE
Certificate of Correction

Patent No. 2,744,116                                           May 1, 1956

Randolph Norris Shreve et al.

It is hereby certified that error appears in the printed specification of the above numbered patent requiring correction and that the said Letters Patent should read as corrected below.

Column 5, claims 2 and 3, the formula in each claim should appear as shown below instead of as in the patent—

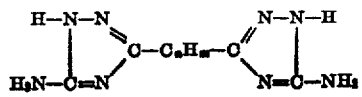

Signed and sealed this 1st day of April 1958.

[SEAL]

Attest:
KARL H. AXLINE,
*Attesting Officer.*
                                 ROBERT C. WATSON,
                                 *Commissioner of Patents.*